US007441359B2

(12) United States Patent
Wang

(10) Patent No.: US 7,441,359 B2

(45) Date of Patent: Oct. 28, 2008

(54) CIRCULAR FRAME FOR INSERTING A PICTURE

(76) Inventor: Dehai Wang, No. 18-7-102, Tianhuali, Huayuan, Nankai District, Tianjin (CN) 300384

( * ) Notice: Subject to any disclaimer, the term of this patent is extended or adjusted under 35 U.S.C. 154(b) by 0 days.

(21) Appl. No.: 11/960,887

(22) Filed: Dec. 20, 2007

(65) Prior Publication Data

US 2008/0148616 A1 Jun. 26, 2008

Related U.S. Application Data

(63) Continuation of application No. PCT/CN2006/001033, filed on May 19, 2006.

(30) Foreign Application Priority Data

Jun. 20, 2005 (CN) .................... 2005 2 0026166 U

(51) Int. Cl.
*G02B 7/02* (2006.01)

(52) U.S. Cl. ........................ 40/661.05; 40/757; 40/745; 63/18; 63/19; 63/24; 63/1.14

(58) Field of Classification Search ................... 38/102, 38/102.91; 40/745, 779, 661.05, 757; 63/1.14, 63/18, 19, 24
See application file for complete search history.

(56) References Cited

U.S. PATENT DOCUMENTS

| | | | | |
|---|---|---|---|---|
| 3,885,333 | A * | 5/1975 | Zachary | 38/102.2 |
| 4,446,642 | A * | 5/1984 | Chap | 40/799 |
| 4,984,378 | A * | 1/1991 | Colman | 38/102.2 |
| 5,355,605 | A * | 10/1994 | Kim | 40/603 |
| 6,868,626 | B1 * | 3/2005 | Linkous | 38/102.91 |
| 2007/0266606 | A1 * | 11/2007 | Morgan | 40/700 |

* cited by examiner

*Primary Examiner*—Lesley D. Morris
*Assistant Examiner*—Shin Kim
(74) *Attorney, Agent, or Firm*—Matthias Scholl, P.C.

(57) ABSTRACT

Provided is a circular advertising frame for receiving a picture, comprising a main frame, a socket half-frame, an insert half-frame, a hanging ring, a concave-convex locking device, and a diaphragm. The circular advertising frame features convenient hanging, easy picture replacement, good stability, esthetic shape and light weight.

1 Claim, 4 Drawing Sheets

CIRCULAR FRAME FOR INSERTING A PICTURE

CROSS-REFERENCE TO RELATED APPLICATIONS

This application is a continuation of International Patent Application No. PCT/CN2006/001033 with an international filing date of May 19, 2006, designating the United States, now pending, and further claims priority benefits to Chinese Patent Application No. 200520026166.7 filed Jun. 20, 2005. The contents of all of the aforementioned specifications are incorporated herein by reference.

BACKGROUND OF THE INVENTION

1. Field of the Invention

The invention relates to advertising accessories, and particularly to a circular advertising frame.

2. Description of the Related Art

Various types of advertising frames are known in the art. For example, from Chinese Pat. Appl. No. 03257923.3 known is an advertising frame which allows for dynamic exhibition. The floating exhibition rack comprises multiple hanging roles and a hanging wire. The hanging roles are connected altogether via the hanging wire. A suspension point, a supporting point, and a hanging point are sequentially disposed on the hanging role. A suspension point of a higher hanging role is connected to a supporting point of the lower hanging role via the hanging wire. Exhibited objects form a floating structure.

The hanging role and the hanging wire of the floating exhibition rack are connected to form a three-dimensional structure. Planar exhibited objects such as pictures and/or three-dimensional objects such as models can be hanged on the hanging point. The exhibited objects and the hanging roles are capable of rotating within the range of 360 degrees. The floating three-dimensional space structure is dynamic, and the exhibited objects swing on the hanging point and float along with the floating exhibition rack, enhancing the exhibition effect.

SUMMARY OF THE INVENTION

One objective of the invention is to provide a circular advertising frame for receiving a picture that can be hanged on a hanging role of a floating exhibition rack or other suspension device, and features convenient hanging, easy replacement, stability, esthetic shape and light weight.

In one embodiment of the invention, the circular advertising frame comprises a ring frame, a socket half-frame, an insert half-frame, a hanging ring, a concave-convex locking device, and a diaphragm. See, FIG. 1.

In a class of this embodiment, the ring frame is a bilaterally symmetrical frame-shaped piece.

In a class of this embodiment, a socket frame starting from a center point of the top of the ring frame and terminating at a center point at the bottom of the ring frame is disposed on one side of the ring frame.

In a class of this embodiment, the cross section of the socket frame is socket-shaped.

In a class of this embodiment, an inner wall of the socket frame is matched with the outer edge on one side of the ring frame.

In a class of this embodiment, the ring frame is integrally-connected to a side wall in the socket frame to form a socket half-frame with a socket. See, FIG. 2.

In a class of this embodiment, another side of the ring frame is an insert half-frame.

In a class of this embodiment, the width of the socket of the socket half-frame is the sum of the thickness of the insert half-frame and that of the picture to be sandwiched. See, FIG. 3.

In a class of this embodiment, a hanging ring is disposed at the center of the top of the ring frame.

In a class of this embodiment, a hanging ring socket is disposed on the socket half-frame in the vicinity of the hanging ring. See, FIG. 4.

In a class of this embodiment, a plurality of concave-convex locking devices is disposed in the center of the bottom of the ring frame.

In a class of this embodiment, the concave-convex locking devices are protrusions and grooves having corresponding shape and size, and a locking device socket is disposed at the socket half-frame of the concave-convex locking device. See, FIG. 5.

In a class of this embodiment, a frame-shaped groove is disposed on one side of the ring frame opposite to the socket half-frame.

In a class of this embodiment, a diaphragm is embedded in and fixed to the frame-shaped groove, to form a plane.

In a class of this embodiment, the invention is applicable to any device that is suspendable.

In a class of this embodiment, the width of the socket of the socket half-frame is the sum of the thicknesses of the insert half-frame and of a picture to be sandwiched.

In a class of this embodiment, two main frames for receiving a picture are oppositely inserted in each other in the left and the right directions in two opposite states.

In a class of this embodiment, an insert half-frame of one main frame for receiving and sandwiching a picture is inserted into the socket of a socket half-frame of the half-frame, and the picture to be exhibited is sandwiched between two diaphragms of the two main frames.

In a class of this embodiment, two hanging rings, each inserted into a hanging ring socket, overlap with one another. See, FIGS. 6-8.

In a class of this embodiment, since two ring frames for receiving a picture are in two opposite states, two opposite concave-convex locking devices are also in two opposite states.

In a class of this embodiment, as one concave-convex locking device is inserted into another concave-convex locking device via the locking device socket, the protrusion on one ring frame for receiving a picture is embedded in the groove of another ring frame, and a groove of the former ring frame for receiving a picture receives a protrusion of the latter ring frame; thus, the two ring frames are aligned and matched with each other, and are fixed together, holding the picture in place.

An advertising frame is realized by a picture sandwiched by a diaphragm, or by a diaphragm rendered with pattern.

In certain classes of this embodiment, the advertising frame with a sandwiched picture is hanged on a hanging role of a floating exhibition rack via a hanging ring at the top thereof.

In certain classes of this embodiment, the advertising frame is rotated by air flow, so as to improve the advertising effect.

In certain classes of this embodiment, the ring frame for receiving a picture is directly hanged at a required exhibition position via the hanging ring. In certain classes of this embodiment, suspension devices such as a hook or a post are used for exhibition.

In certain classes of this embodiment, when the exhibited picture is to be changed, it is only required to pull the two ring frames to the left and the right correspondingly, so as to unlock the concave-convex locking device. After the picture is changed, re-insertion is performed, which is convenient and easy.

In certain embodiments, the invention employs a structure comprising a ring frame, a socket half-frame, an insert half-frame, a hanging ring, a concave-convex locking device and a diaphragm, prevents disadvantages attributable to relatively high weigh of exhibition plates in conventional devices and reduces the overall weight. This not only improves the strength of the hanging hook for suspension, but also decreases cost, and makes a billboard hanged on the hanging role more amenable to floating and swinging.

Figure 1:
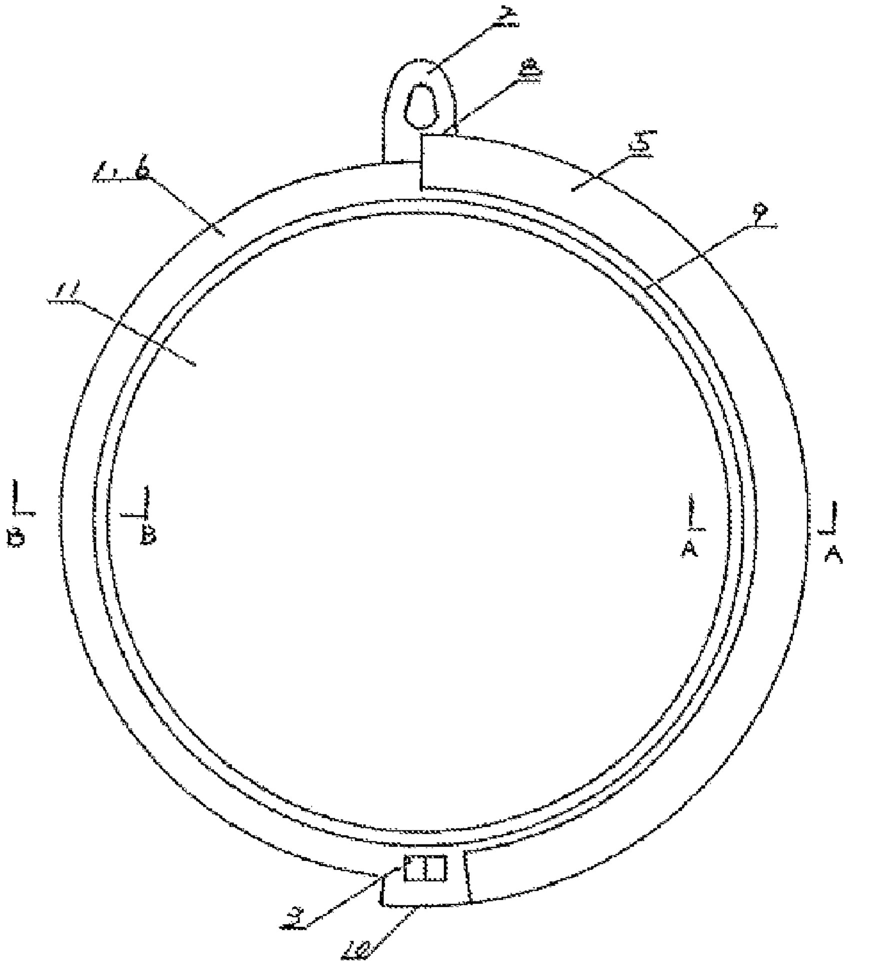
FIG. 1 is a front view of a disassembled circular advertising frame according to one embodiment of the invention.
Figure 2:
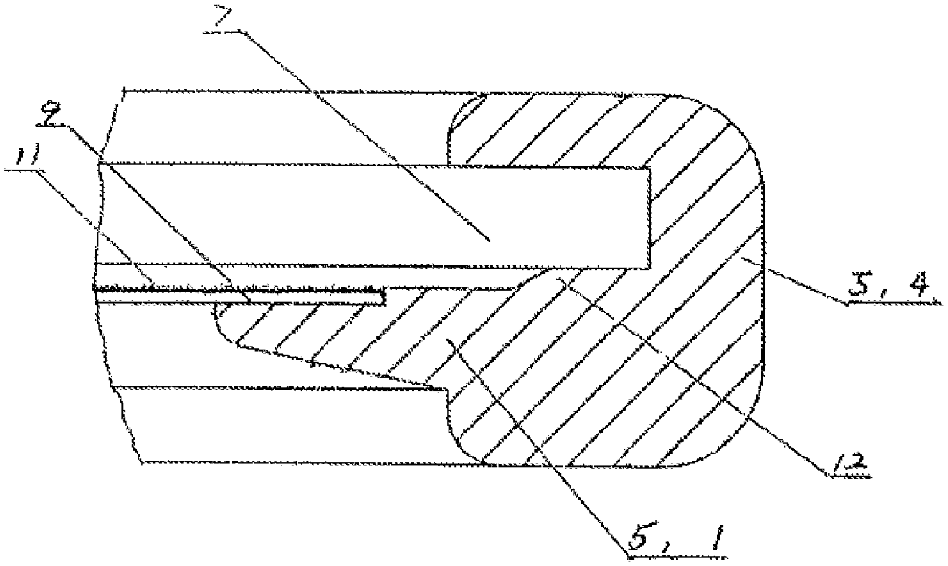
FIG. 2 is an enlarged view along the A-A line in FIG. 1.
Figure 3:
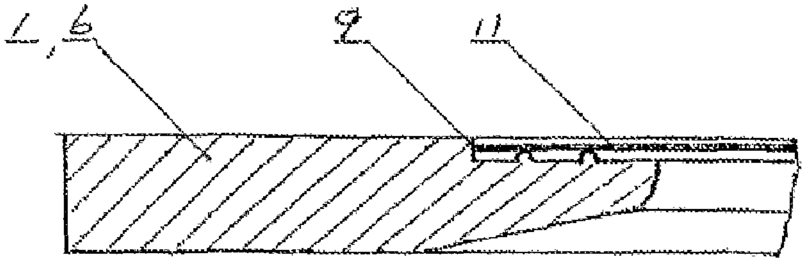
FIG. 3 is an enlarged view in along the B-B line in FIG. 1.
Figure 4:
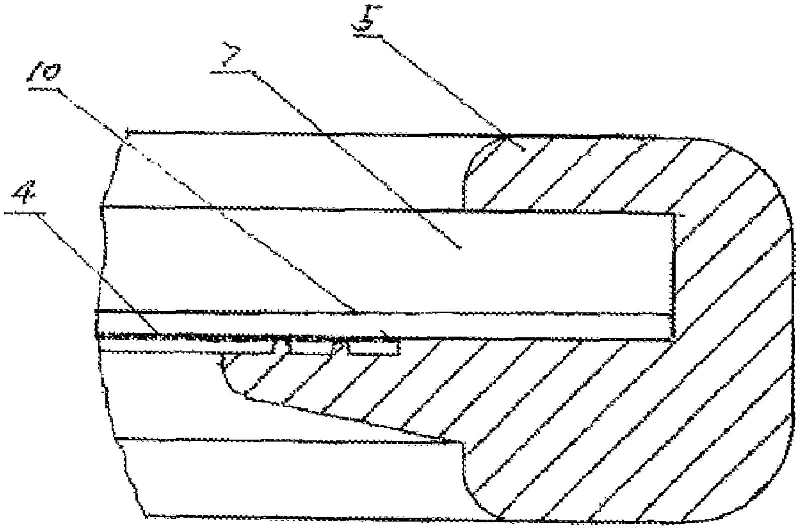
FIG. 4 is a an enlarged view in the A-A direction in FIG. 1 where a protrusion is disposed in the socket half-frame of the half-frame.
Figure 5:
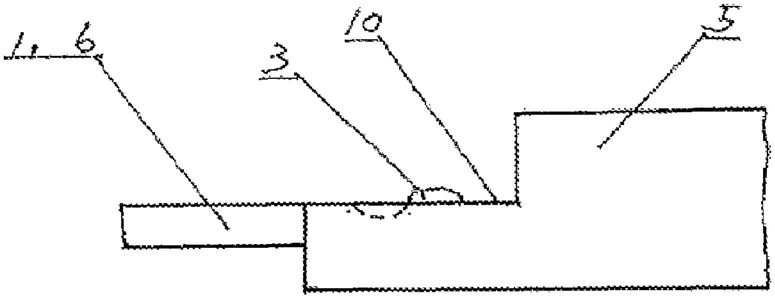
FIG. 5 is a bottom partial enlarged view of the embodiment shown in FIG. 1.
Figure 6:
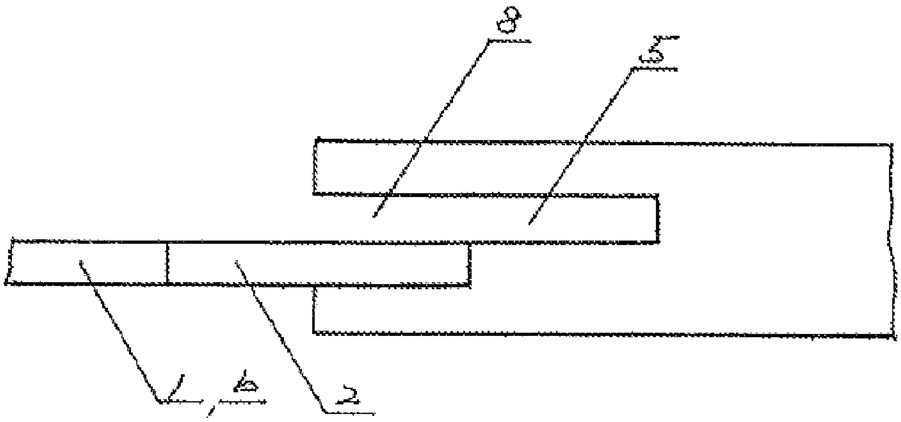
FIG. 6 is a top partial enlarged view of the embodiment shown in FIG. 1.
Figure 7:
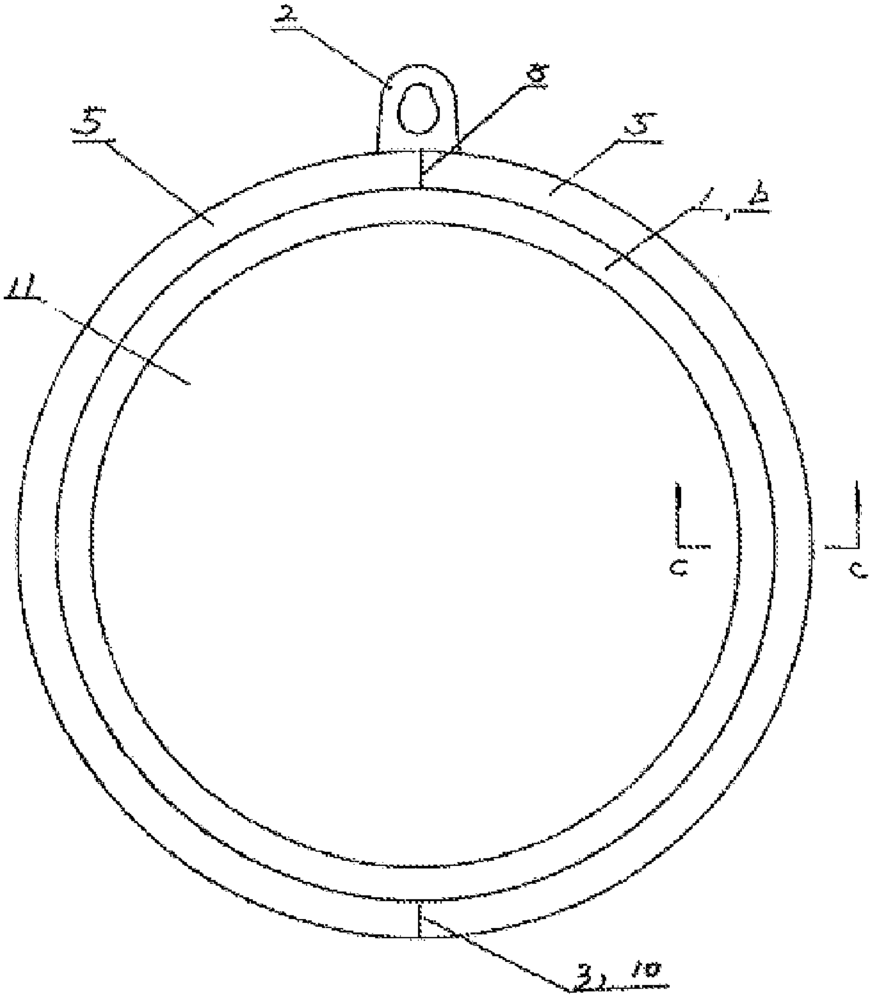
FIG. 7 is front view of an assembled circular advertising frame according to one embodiment of the invention.
Figure 8:
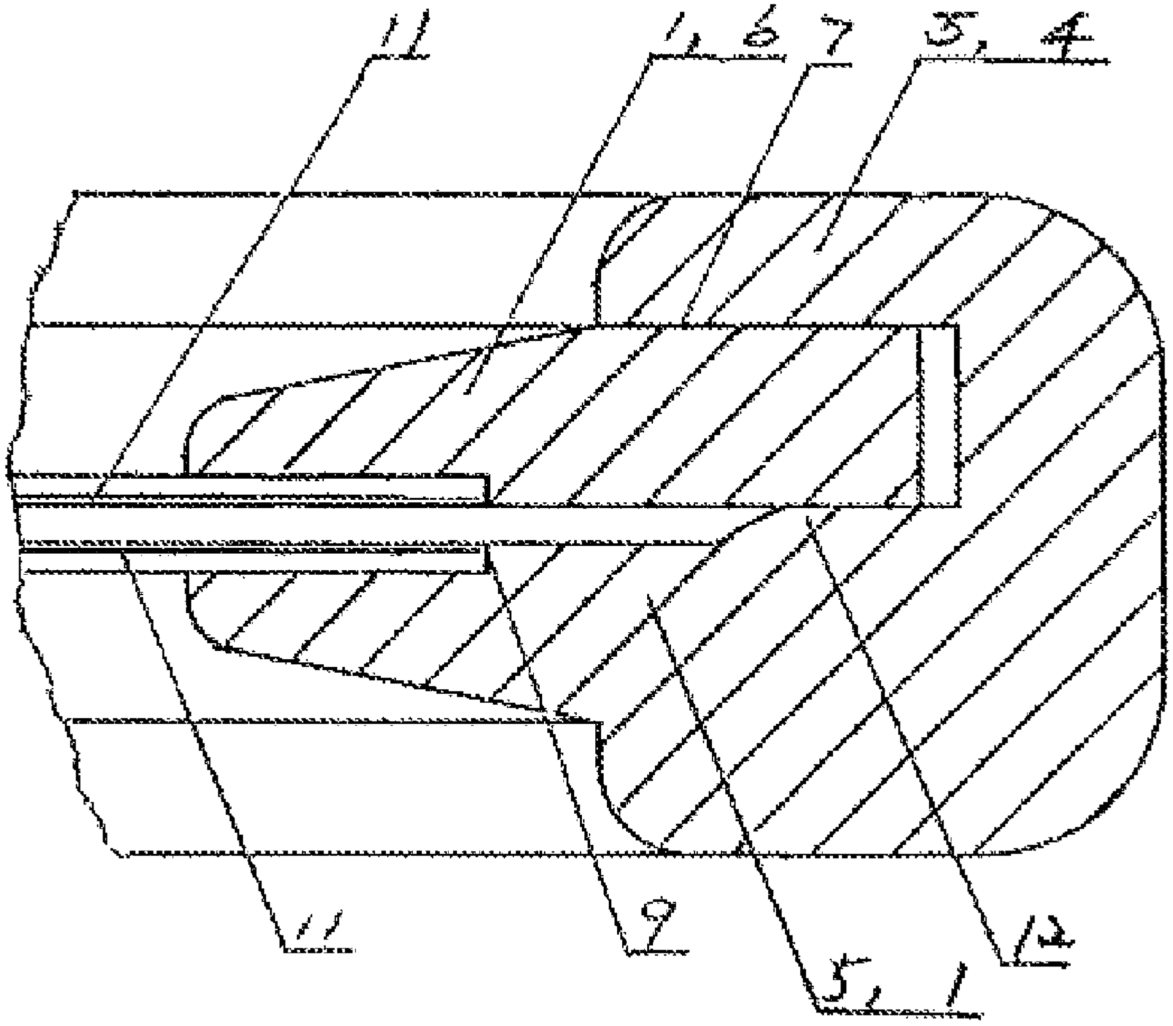
FIG. 8 is an enlarged view in the C-C direction in FIG. 7.

Legend: 1-ring frame; 2-hanging ring; 3-concave-convex locking device; 4—diaphragm; 5-socket half-frame; 6-insert half-frame; 7-socket; 8-hanging ring socket; 9—ring-shaped groove; 10-locking device socket; 11-picture; 12-insert-socket juncture.

DETAILED DESCRIPTION OF THE INVENTION

The parts used in embodiments of the invention are made of engineering plastics via compression molding. The main frame 1 is a circular piece with an inner diameter of 18.0 cm and an outer diameter of 19.0 cm, and has a ring-shaped groove 10 with a radius of 19.0 cm and a depth of 1.0 cm.

A thickness of the diaphragm 4 is 1.0 cm, and the diaphragm 4 is embedded, and fixed in the ring-shaped groove 10.

An outer diameter of a socket half-frame 5 is 22.5 cm; the width of a socket 7 is 0.5 cm; the outer diameter of the insert half-frame 6 is 22.0 cm, and the thickness thereof is 0.3 cm.

The hanging ring 2 and the bell-shaped hanging ring socket 9 are disposed at the top of the main frame 1. The length of the bell-shaped bottom of the hanging ring 2 is 3.0 cm, and the length of the hanging ring socket 9 is 1.5 cm.

The concave-convex locking device 3 is disposed at the bottom of the main frame 1 opposite to the socket 7.

Two main frames are oppositely inserted into each other in the left and right directions. The insert half-frame 6 of one of the two main frames is inserted into a socket 7 of a socket half-frame of the other main frame. A picture with the thickness of 0.2 cm is placed between diaphragms 4 of the two main frames prior to inserting and joining the two main frames.

As the two identical main frames are inserted into one another, they overlap and form a ring. A picture is sandwiched between the two diaphragms 4. A protrusion on one main frame 1 is aligned, matched with, and fixed to a groove on another main frame 1, and vice versa.

Two main frames for receiving a picture are inserted into each other are hanged on a hanging role of a floating exhibition rack via the hanging ring 2. Thus, the objective of convenient hanging, easy replacement, good stability, esthetic shape and light weight is realized.

What is claimed is:

1. A circular advertising frame for receiving a picture, comprising
- a main frame;
- a socket half-frame;
- an insert half-frame;
- a hanging ring;
- a concave-convex locking device; and
- a diaphragm;

wherein
- the main frame is a bilaterally symmetrical;
- a socket frame starting from a center point of the top of the main frame and terminating at a center point at the bottom of the main frame is disposed on one side of the main frame;
- a cross section of the socket frame is socket-shaped;
- an inner wall of the socket frame is matched with an outer edge on one side of the main frame;
- the main frame is integrally connected to a side wall in the socket frame to form a socket half-frame with a socket;
- another side of the main frame is an insert half-frame;
- the width of the socket of the socket half-frame is a sum of thicknesses of the insert half-frame and of a picture to be received;
- a hanging ring is disposed in the center of the top of the main frame;
- a hanging ring socket is disposed on the socket half-frame in the vicinity of the hanging ring;
- a plurality of concave-convex locking devices is disposed in the center of the bottom of the main frame;
- the concave-convex locking devices are protrusions and grooves with corresponding shape and size,
- a locking device socket is disposed at the socket half-frame of the concave-convex locking device;
- a frame-shaped groove is disposed on one side of the main frame opposite to the socket half-frame; and
- a diaphragm is embedded in and fixed to the frame-shaped groove, to form a plane.

* * * * *